United States Patent [19]

Blocker

[11] Patent Number: 5,266,089
[45] Date of Patent: Nov. 30, 1993

[54] MULTI-POSITIONABLE FLUID TRAP

[76] Inventor: William C. Blocker, 1406 N. Butler Ave., Indianapolis, Ind. 46219

[21] Appl. No.: 972,758

[22] Filed: Nov. 6, 1992

[51] Int. Cl.$^5$ .............................................. B01D 45/08
[52] U.S. Cl. ........................................ 55/319; 55/320; 55/417; 210/448
[58] Field of Search ................. 55/319, 320, 417, 420; 210/446, 448, 497.3

[56]         References Cited
        U.S. PATENT DOCUMENTS

| 540,539 | 6/1895 | Conness | 55/429 |
|---------|--------|---------|--------|
| 929,270 | 7/1909 | Ashton | 55/319 |
| 2,068,837 | 1/1937 | Aronson | 210/446 |
| 2,952,331 | 9/1960 | Beach | 55/323 |
| 3,794,180 | 2/1974 | Blocker | 210/445 |
| 4,655,803 | 4/1987 | Katchka et al. | 55/417 |
| 4,702,754 | 10/1987 | Blocker | 55/274 |

Primary Examiner—Tim Miles
Attorney, Agent, or Firm—Woodard, Emhardt, Naughton, Moriarty & McNett

[57]         ABSTRACT

A multi-positionable sediment trap for use with a vapor delivery pressure system. The main body of the adaptor is tubular with the opposite ends extending into end caps. A diverter tube is sealingly and fixedly mounted to one end cap, whereas an outlet control tube is sealingly and fixedly mounted to the opposite end cap. Each tube is located off center relative to the longitudinal axis of the main body forming a sediment chamber into which is directed the gas and sediment from the diverter tube with the gas then flowing from the sediment chamber to the outlet tube. A flared cone filter is mounted within the outlet tube.

13 Claims, 1 Drawing Sheet

MULTI-POSITIONABLE FLUID TRAP

BACKGROUND OF THE INVENTION

1. Field of the Invention

This invention is in the field of filtering devices utilized to screen fluids, such as gas.

2. Description of the Prior Art

I have disclosed in U.S. Pat. No. 4,702,754 an adaptor for installation at the outlet of a pressurized gas regulator. The adaptor includes an inner chamber having a flared cone shaped screen filter through which the pressurized fluid or gas is directed. In addition, a check valve is mounted to the adapter to allow testing of the gas pressure within the adaptor. The adaptor further includes a downwardly extending sediment trap used for the purpose of collecting foreign impurities from the gas.

There are approximately 15 million self-contained propane or additional millions natural gas delivery systems in the United States being utilized as the primary source of combustion heat in furnaces, stoves, water heaters etc. Various regulations have been established requiring the presence of a pressure valve located between the source of pressurized gas and the furnace or other such utility. In addition, filtering of the gas prior to reaching the burner is necessary to prevent the burner orifices from becoming clogged. In many cases, the pipe or conduit extending from the source of pressurized gas to the burner is located near a vertical side wall or a horizontally extending bottom wall, such as a concrete slab. Thus, an adaptor having a downwardly extending trap becomes difficult to install in the event the trap interferes or contacts the concrete slab or other external object located near the pipe or conduit. I have therefore designed a trap having a filter and pressure valve while also including a foreign sediment trap which may be installed in any position or orientation to circumvent the problems normally encountered when the trap is located near a wall or other external object.

SUMMARY OF THE INVENTION

One embodiment of the present invention is a trap for solid and/or liquid impurities in a fluid comprising, a hollow main body having a longitudinal axis and a fluid entrance and a fluid exit. The hollow main body has a sediment chamber offset from but in fluid communication with the fluid entrance and the fluid exit for holding the solid impurities carried by the fluid. The trap further includes an inlet coupler at the fluid entrance connectable to a source of fluid, and an outlet coupler at the fluid exit. A diverter within the main body is operable to direct the fluid with the impurities to the chamber.

It is an object of the present invention to provide a new and improved vapor delivery pressure test adaptor.

In addition, it is an object of the present invention to provide a foreign sediment trap for use with a pressurized gas delivery system which may be mounted in a variety of locations and orientations.

Related objects and advantages of the present invention will be apparent in the following description.

DESCRIPTION OF THE PREFERRED EMBODIMENT

Figure 1:
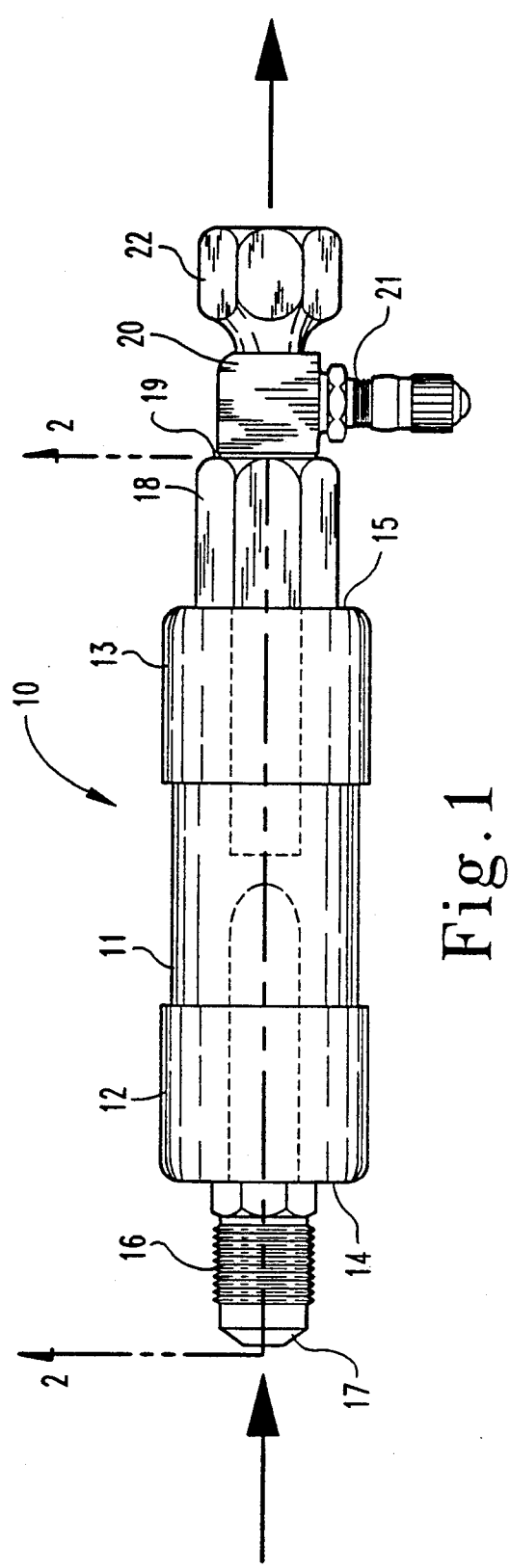
FIG. 1 is a top view of the trap incorporating my present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawing, adaptor 10 includes a hollow main body composed of a cylindrical tube 11 having a first end extending into cap 12 and a second end extending into cap 13. Caps 12 and 13 are fixedly and sealingly attached to tube 11 by soldering or other means to insure that gas within tube 11 does not escape between the junction of tube 11 and cap 12 and tube 11 and cap 13. The opposite ends 14 and 15 respectively of caps 12 and 13 are closed except for a single aperture located off center on cap 12 in fluid communication with an externally threaded coupling 16 having an end 17 in fluid communication with a source of pressurized gas and with the further exception of an off centered aperture located in end 15 in fluid communication with an externally threaded coupling 20 connected via coupling 22 to a pipe or conduit extending to the burner or other utility receiving the pressurized gas.

Inlet tube 28 is fixedly and sealingly mounted to cap 14 and extends through the aperture in cap 14 shown located above the longitudinal and center axis 30 of tube 11. Coupling 16 is sealingly and fixedly connected to the end of tube 28 so that the inward flowing pressurized gas is directed into the hollow interior 32 of inlet tube 28. A second tube 29 is mounted to and extends through the aperture of cap 13 being located offset and above axis 30 with the longitudinal axis of tube 29 being aligned with the longitudinal axis of tube 28. The interior inlet end 34 of tube 29 opens toward tube 28 whereas the interior outlet end 33 of tube 28 opens downwardly into a sediment storage chamber 31 located between the bottom wall 27 of tube 11 and axis 30.

Axis 30 extends centrally and longitudinally through tube 11 with the upper half of the tube between axis 30 and top wall 26 of the tube having located therein the inlet tube 28 which forms a diverter tube and the outlet tube 29 which forms an outlet control tube. Thus, the lower half portion of the tube existing between the bottom wall 27 of the tube and axis 30 forms the sediment trap or chamber into which gas is directed via outlet 33 of tube 28. Once the gas is directed into chamber 31, the sediment remains therein under the force of gravity, whereas the pressurized gas flows upwardly and then through inlet 34 into outlet tube 29.

A hexagonally shaped internally threaded coupling 18 is fixedly mounted to end 15 of cap 13 and to the outer end of tube 29 thereby cantileveredly mounting tube 29 to cap 13. Likewise, coupling 16 is fixedly mounted to the end of cap 12 and to the outwardly extending end of tube 28 thereby cantileveredly mounting tube 28 to cap 12.

Coupling 18 includes a hollow interior freely receiving a flared cone filter 36. Filter 36 is well known in the prior art. A flared cone filter of this general type is disclosed in U.S. Pat. No. 3,794,180 which is incorporated herein by reference. The flared cone filter 36 includes a flared ring having a conically shaped screen attached thereto. The flared ring is seated within coupling 18 and rests upon a beveled truncated conical surface surrounding the aperture extending through coupling 18 and located adjacent the end of tube 29. The remaining portion of the internal passage of coupling 18 is internally threaded to receive the externally threaded end 38 of coupling 20 which extends through end 19 of coupling 18. By unthreading coupling 20 from coupling 18, the flared cone filter may be removed and replaced.

Coupling 20 includes a longitudinally extending hollow passage extending there through and out through internally threaded coupling 22 which is conventional in design being connected to the externally threaded adjacent pipe. A check valve 21 also well known in the prior art is mounted to coupling 20 and is in fluid communication with the internal passage extending through coupling 20 thereby allowing the internal pressure to be checked within coupling 20, and thus within tube 11. Check valve 21 is mechanically of the same type utilized in the standard automobile tire valve system and is of a caliber approved for utilization with vapor such as propane gas or natural gas. I have disclosed valve 21 in U.S. Pat. No. 4,702,754 which is herewith incorporated by reference.

Coupling 16 is of conventional design and may have a ⅜ inch outside diameter and a 45° SAE flared end. Likewise, coupling 18 is of conventional design and may have a ⅜ inch inside diameter with an internal 45° SAE flared seat to receive the ring of flared filter 36 and the internally located flared end 38 of conventional coupling 20.

The direction of the gas is shown by the bold arrows entering coupling 16 and passing via outlet 33 into chamber 31 and then exiting via tube 29 passing through the flared screen filter.

The trap disclosed herein may be oriented or mounted in a variety of positions. For example, in the event the pipe extends horizontal from the source of pressurized gas to the burner and is located close to a vertically extending wall, then adaptor 10 may be mounted to the pipe so that chamber 31 is located to the side or offset from the vertical wall. Tube 11 may be rotated to position chamber 31 apart from the external vertical wall but slightly beneath the horizontal pipe to allow for the collection of sediment. Likewise, in the event the pipe is located immediately above a horizontally extending floor then the compact nature of chamber 31 allows the chamber to extend horizontally beneath the pipe and above the floor.

Figure 2:
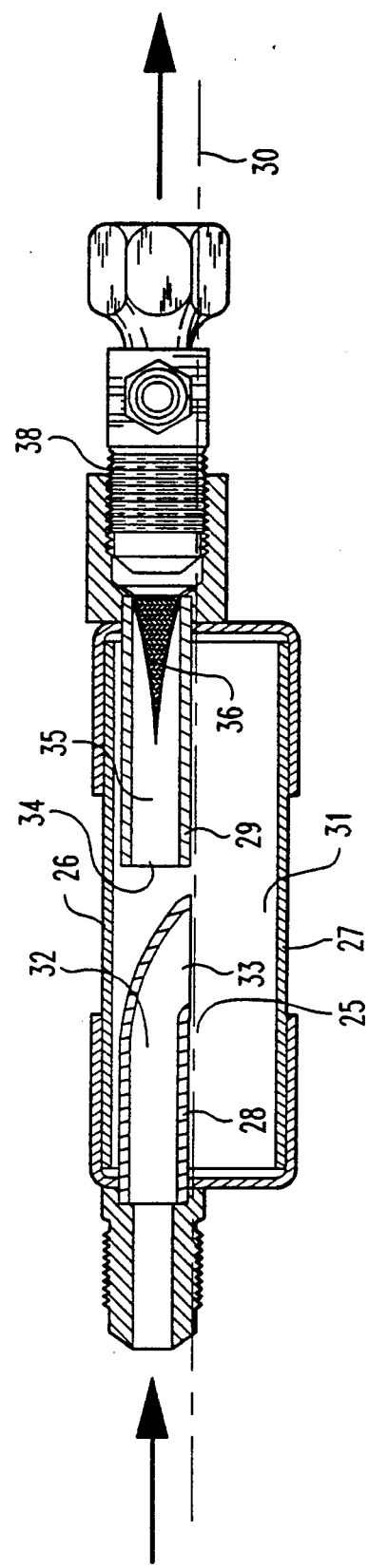
FIG. 2 is a side cross sectional view of the trap taken along the line 2—2 of FIG. 1 and viewed in the direction of the arrows.

Alternatively, many pipes extending from the source of pressurized gas to the burner run vertically, thereby requiring adaptor 10 to be mounted with axis 30 extending vertically. Tube 11 is divided into three sections: the first section adjacent to cap 14 extending approximately one third the length of tube 12, a second section adjacent to cap 13 extending approximately one third the length of tube 11 and the central section located between the first and second sections extending the remaining one third length of the tube. Tubes 28 and 29 as shown in FIG. 2 open into the central section which is located quidistant between the caps 12 and 13. Thus, tubes 28 and 29 open into chamber 31 in an area approximately equidistant between caps 12 and 13. In the event, the adapter is mounted vertically with axis 30 extending vertically, then that portion of chamber 31 extending between a cap and the outlet 33 of tube 28 forms a sediment holding area. For example, with tube 11 extending vertically and cap 12 located beneath 13, a sediment holding area is formed in chamber 31 between cap 12 and outlet 33 whereas if cap 13 is located below cap 12 then a sediment holding area is formed in chamber 31 between cap 13 and outlet 33. Regardless of the orientation and direction of the pipe extending between the source of pressurized fluid and the burner, adaptor 10 may be mounted in such a way to position sediment chamber 31 to facilitate the collection of sediment therein.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A trap for impurities in a fluid comprising:
   a hollow main body having a longitudinal axis and with a fluid entrance and a fluid exit, said hollow main body further having a sediment chamber offset from but in fluid communication with said fluid entrance and said fluid exit for holding impurities carried by the fluid;
   inlet coupling means on said hollow body at said fluid entrance and connectable to a source of fluid;
   outlet coupling means on said hollow body at said fluid exit; and,
   diverter means within said main body operable to direct said fluid with said impurities flowing into said hollow main body via said fluid entrance to said chamber,
   said main body includes a first end portion and a second end portion with a center portion located equidistant therebetween, said fluid exit and said fluid entrance extending into and opening into said center portion with said first end portion forming a first sediment area when said axis extends vertically and said first end portion is located beneath said second end portion, said second end portion forming a second sediment area when said axis extends vertically and said second end portion is located beneath said first end portion.

2. The trap of claim 1 wherein:
   said center portion along with said first sediment area and said second sediment area forming a large sediment area when said axis extends horizontally.

3. The trap of claim 1 wherein:
   said main body includes an inwardly extending first tube and second tube mounted thereto respectively at said fluid entrance and said fluid exit, said first tube has an outlet located within said main body which forms said diverter means, said second tube has an inlet located within said main body with said outlet opening into said chamber and directed away from said inlet, said first tube and said second tube have aligned longitudinal axes offset from said longitudinal axis of said main body.

4. The trap of claim 3 wherein:

said center portion along with said first sediment area and said second sediment area forming a large sediment area when said axis extends horizontally, said first tube and said second tube are located offset and above said axis with said large sediment area located beneath said axis when said axis extends horizontally.

5. A sediment trap comprising:

a hollow main body having a longitudinal axis and with a fluid entrance tube and a fluid exit tube, said hollow main body further having a sediment chamber in fluid communication with said fluid entrance tube and said fluid exit tube for holding impurities carried by the fluid, said main body includes a first portion and a second portion with a third portion located therebetween, said fluid entrance tube and said fluid exit tube having longitudinal axes parallel to said axis of said main body and extending into and opening into said hollow main body with said first portion forming a first sediment area when said axis extends vertically and said first portion is located beneath said second portion, said second portion forming a second sediment area when said axis extends vertically and said second portion is located beneath said first portion, said center portion forming a large sediment area when said axis extends horizontally.

6. The trap of claim 5 and further comprising:

diverter means within said main body operable to direct said fluid with said impurities flowing into said hollow main body via said fluid entrance tube to said chamber; and wherein:

said first portion is a first end portion and said second portion is a second end portion and said third portion is a center portion located equidistant therebetween, said fluid entrance tube and said fluid exit tube opening into said center portion with said first end portion forming said first sediment area when said axis extends vertically and said first end portion is located beneath said second end portion, said second end portion forming said second sediment area when said axis extends vertically and said second end portion is located beneath said first end portion.

7. The trap of claim 6 wherein:

said center portion along with said first sediment area and said second sediment area forming a large sediment area when said axis extends horizontally.

8. The trap of claim 7 wherein:

said fluid entrance tube and said fluid exit tube are located offset and above said axis with said large sediment area located beneath said axis when said axis extends horizontally.

9. An adapter for installation in a gas line comprising:

a main body with a gas inlet and a gas outlet with a chamber located therein, said chamber includes a sediment storage area into which said gas inlet opens to receive impurities carried by said gas with said gas flowing out of said sediment storage area and out through said gas outlet, said sediment chamber located beneath said gas inlet when said main body is mounted so said gas outlet is located above said gas inlet whereas said sediment chamber located beneath said gas outlet when said main body is mounted so said gas inlet is located above said gas outlet;

gas pressure measurement valve means mounted to said body at said gas outlet in fluid communication with gas flowing through said gas outlet;

first coupling means mounted to said main body at said gas inlet operable to mount said main body; and, second coupling means mounted to said main body at said gas outlet operable to mount said main body.

10. The adapter of claim 9 wherein:

said main body has a longitudinal axis and said gas inlet forms diverter means within said main body operable to direct said gas with said impurities flowing into said main body via said gas inlet to said chamber.

11. The trap of claim 10 wherein:

said main body includes a first end portion and a second end portion with a center portion located equidistant therebetween, said gas inlet and said gas outlet opening into said center portion with said first end portion forming a first sediment area when said axis extends vertically and said first end portion is located beneath said second end portion, said second end portion forming a second sediment area when said axis extends vertically and said second end portion is located beneath said first end portion.

12. The trap of claim 11 wherein:

said center portion along with said first sediment area and said second sediment area forming a large sediment area when said axis extends horizontally.

13. The trap of claim 12 wherein:

said gas inlet and said gas outlet are located offset and above said axis with said large sediment area located beneath said axis when said axis extends horizontally.

* * * * *